United States Patent Office 3,576,023
Patented Apr. 20, 1971

1

3,576,023
METHOD FOR PREPARATION OF Si—H
FUNCTIONAL ORGANODISILOXANES
James William Curry, Dallas, Tex., assignor to Texas
Instruments Incorporated, Dallas, Tex.
No Drawing. Filed July 31, 1968, Ser. No. 748,932
Int. Cl. C07f 7/08
U.S. Cl. 260—448.2
5 Claims

ABSTRACT OF THE DISCLOSURE

Reacting a tertiary alcohol such as tert-butyl alcohol [$(CH_3)_3COH$] with a diorganohalosilane such as dimethylchlorosilane [$(CH_3)_2SiHCl$] to produce Si—H functional organodisiloxanes such as sym-tetramethyldisiloxane $$\begin{bmatrix} & CH_3 & CH_3 & \\ H-&Si-O-Si&-H \\ & CH_3 & CH_3 & \end{bmatrix}$$

having Si—H bonds.

---

This invention relates to a method for the preparation of Si—H functional organodisiloxanes, and more particularly to a method of preparing Si—H functional organodisiloxanes by reaction of a tertiary alcohol with a diorganohalosilane.

An organodisiloxane having Si—H functionality has been prepared by hydrolyzing dimethylchlorosilane with ice under very closely controlled temperature conditions. However, the yields of organodisiloxane can be poor since the Si—H bonds in the organodisiloxane can be cleaved by the HCl formed as a by-product of the reaction. Cleavage of the Si—H bond will produce a linear dimethylsiloxane polymer. The production of the linear polymer may be illustrated by the following equation:

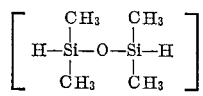
$nCH_3-Si-Cl + nH_2O \longrightarrow [(CH_3)_2SiO]_n + nHCl + nH_2$

The preparation of organosiloxanes by the general method described above is taught by Sauer et al., Derivatives of the Methylchlorosilanes v. Polysiloxanes From Methyldichlorosilane, J. Am. Chem. Soc., 68, 962 (1946); R. Okawara and M. Sakiyama, Bull. Chem. Soc., Japan, 29, 236 (1956); and R. Okawara, J. Chem. Soc. Japan, Ind. Chem. Sec., 60, 1398 (1957).

Organodisiloxanes having Si—H functional groups can be prepared by the present invention without the low temperature requirements of the prior art and without HCl cleavage of the Si—H bond.

The present invention may be generally described as a process of preparing Si—H functional organodisiloxanes by reacting a tertiary alcohol with a diorganohalosilane. To be more specific, reference is made to Example I which relates to the preparation of sym-tetramethyldisiloxane by the following reaction:

(1)
$2(CH_3)_2SiHCl + 2(CH_3)_3COH \xrightarrow{\text{Solvent}}$

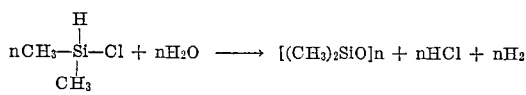
$H-\underset{CH_3}{\underset{|}{Si}}-O-\underset{CH_3}{\underset{|}{Si}}-H + 2(CH_3)_3C-Cl + H_2O$

2

EXAMPLE I

To a three necked separatory funnel maintained at ambient temperature and vented to the atmosphere through a condenser attached to one of the necks was added 444.7 grams (6.0 moles) of tert-butyl alcohol [$(CH_3)_3COH$] and 2.5 liters of toluene solvent. Through an addition funnel carried by another neck of the separatory funnel, there was added 567.6 grams (6.0 moles) of dimethylchlorosilane [$(CH_3)_2SiHCl$]. The dimethylchlorosilane was added dropwise over a 3.5 hour period while the solution in the separatory funnel was stirred by a motor driven stirring rod suspended through the center neck of the separatory funnel, and stirring was continued for 30 minutes after the addition had been completed. The solution in the separatory funnel was permitted to set overnight. To extract water formed in the reaction from the organic solvent, a small amount of water was added to the funnel to force separation of the relatively larger amount of by-product water from the organic phase. The total aqueous phase was then removed. The organic phase in the funnel was permitted to set overnight, then dried with $Na_2SO_4$ and filtered. It was then placed in a distillation flask. After stripping of the tert-butyl chloride, which was formed in the reaction, the product, sym-tetramethyldisiloxane, was collected as a fraction which boiled between 70.6 and 71.0° C. at atmospheric pressure (743–747 mm. Hg).

The collected fraction of sym-tetramethyldisiloxane weighed 311.3 grams for a yield of 79.5% of theoretical, and the refractive index ($n_D^{25}$) was found to be 1.3674.

In the above reaction (1) a side reaction involving the tert-butyl chloride occurs to a limited extent, giving a small amount of HCl, which, however, has no effect on the organodisiloxane. This is demonstrated by the fact that the removal of all readily distillable constituents, including the solvent, from the flask leaves no residue of any kind.

In the above reactions, various tertiary alcohols may be used, although tert-butyl alcohol is preferred. For example, 3-methyl-3-pentanol, 2,3-dimethyl-2-butanol, 2-methyl-2-pentanol, tert-amyl alcohol, 2-methyl-3-buten-2-ol, and triphenylcarbinol may be used, as well as any of the tertiary alcohols having a lower alkyl, lower alkenyl, lower alkynyl, or aryl radicals attached to the C—OH group.

In addition to dimethylchlorosilane, other diorganohalosilanes such as diethylchlorosilane, diphenylchlorosilane, divinylchlorosilane, diethynylchlorosilane, dipropargylchlorosilane, di[chlorophenyl]chlorosiane, di[alpha-naphthyl]chlorosilane, and other diorganohalosilanes having lower alkyl, lower alkenyl, lower alkynyl, or aryl (unsubstituted and halogen and nitro substituted) groups attached to the silicon atom may be used.

Further, while the reaction can be carried out in toluene, as illustrated above, any suitable non-reactive solvent may be used, such as pentane or xylene.

The Si—H containing organodisiloxanes of the present invention may be utilized in the same manner as those produced by the prior art method or preparation. The compounds may be reacted to produce organosilicon fluids, emulsifiers, resins, and rubbers.

They may also be utilized in the preparation of compositions for imparting water-repellency to paper and textile articles.

While rather specific terms have been used to describe embodiments of the invention, they are not intended, nor should they be construed as a limitation on the invention as defined by the following claims.

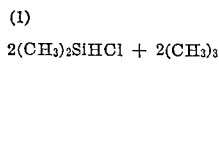

I claim:
1. The process of preparing Si—H functional tetraorganodihydrodisiloxanes comprising the step of:
reacting a tertiary alcohol having the expanded structural formula:

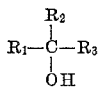

with a diorganohalosilane having the formula $(R_4)_2SiHX$, where $R_1$, $R_2$, $R_3$ and $R_4$ are selected independently from the group consisting of lower alkyls, cycloalkyls, lower alkenyls, lower alkynyls, arylalkyls, aryls (unsubstituted and halogen and nitro substituted) and X is selected from the group consisting of chlorine, bromine and iodine.

2. The process of claim 1, wherein $R_1$, $R_2$, $R_3$ and $R_4$ are all alkyl groups.

3. The process of claim 1, wherein said tertiary alcohol is tertiary-butyl alcohol and said diorganohalosilane is a dialkylhydrohalosilane.

4. The process of claim 1, wherein said tertiary alcohol is tertiary-butyl alcohol and said diorganohalosilane is dimethylchlorosilane.

5. The process of claim 4 wherein said reaction is carried out in solution with an unreactive organic solvent, and includes the steps of:
separating said organic solvent and the product dissolved therein from water formed in said reaction; and
distilling the organic solvent and product dissolved therein to separate said product from said organic solvent.

References Cited

UNITED STATES PATENTS 3,432,538   3/1969   Curry _____ 260—448.2(E)

TOBIAS E. LEVOW, Primary Examiner

P. F. SHAVER, Assistant Examiner

U.S. Cl. X.R.
260—448.2H